(No Model.) 4 Sheets—Sheet 1.

W. REEVES.
COIN CONTROLLED APPARATUS.

No. 582,685. Patented May 18, 1897.

WITNESSES:
H. Coleman
George W. Adams

INVENTOR
William Reeves
BY
Robinson Fisher
ATTORNEYS.

(No Model.) 4 Sheets—Sheet 2.

W. REEVES.
COIN CONTROLLED APPARATUS.

No. 582,685. Patented May 18, 1897.

WITNESSES:
H. Coleman
George W. Adams

INVENTOR
William Reeves
BY
Robinson Fisher,
ATTORNEYS.

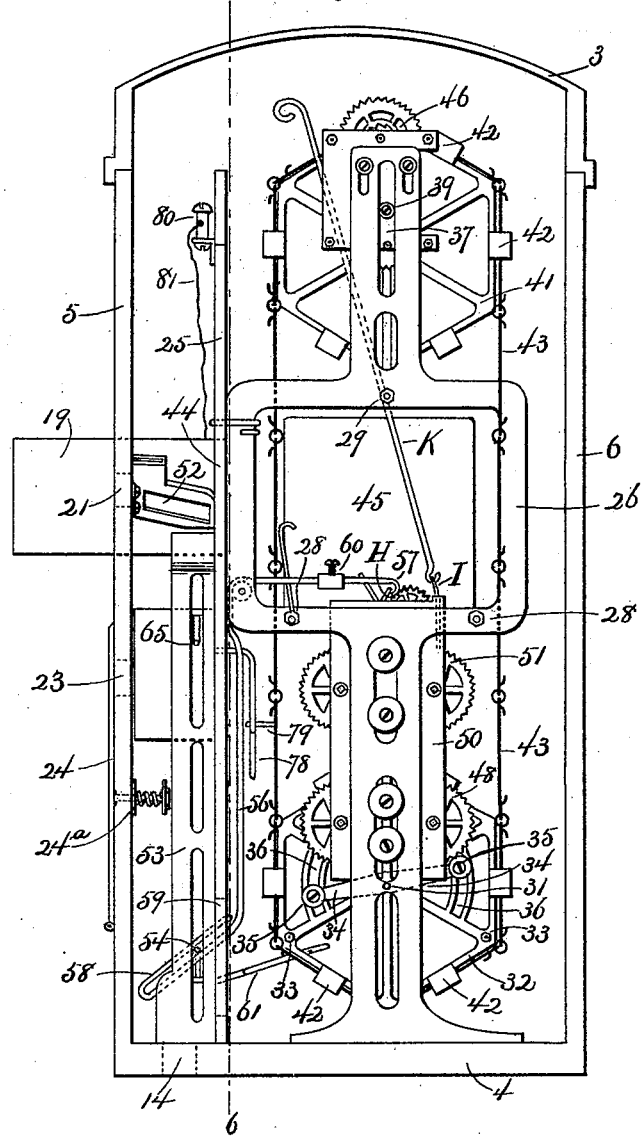

(No Model.) 4 Sheets—Sheet 4.

W. REEVES.
COIN CONTROLLED APPARATUS.

No. 582,685. Patented May 18, 1897.

WITNESSES:
J. H. Coleman
George W. Adden

INVENTOR
William Reeves
BY
Robinson Fish
ATTORNEYS.

UNITED STATES PATENT OFFICE.

WILLIAM REEVES, OF NEW HAVEN, CONNECTICUT.

COIN-CONTROLLED APPARATUS.

SPECIFICATION forming part of Letters Patent No. 582,685, dated May 18, 1897.

Application filed February 8, 1897. Serial No. 622,513. (No model.)

*To all whom it may concern:*

Be it known that I, WILLIAM REEVES, of the city and county of New Haven, in the State of Connecticut, have invented a new and useful Improvement in Coin-Controlled Apparatus, fully set forth and described in the following specification, taken in connection with the drawings which form a part thereof, and in which—

Figure 1:
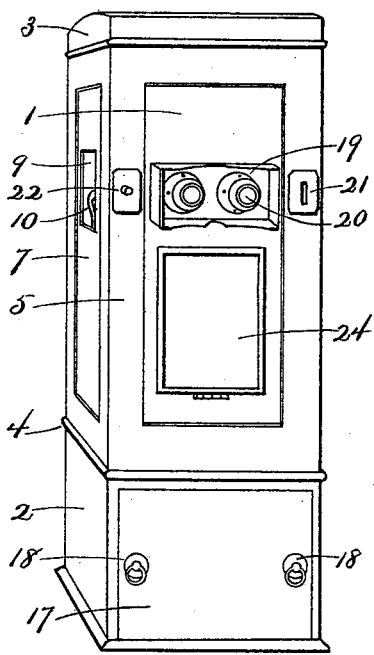
Figure 2:
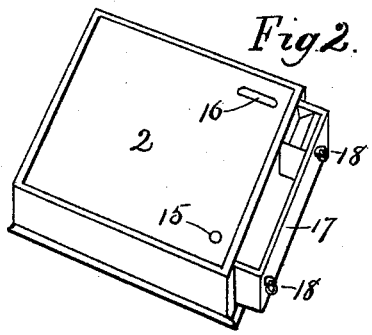
Figure 4:
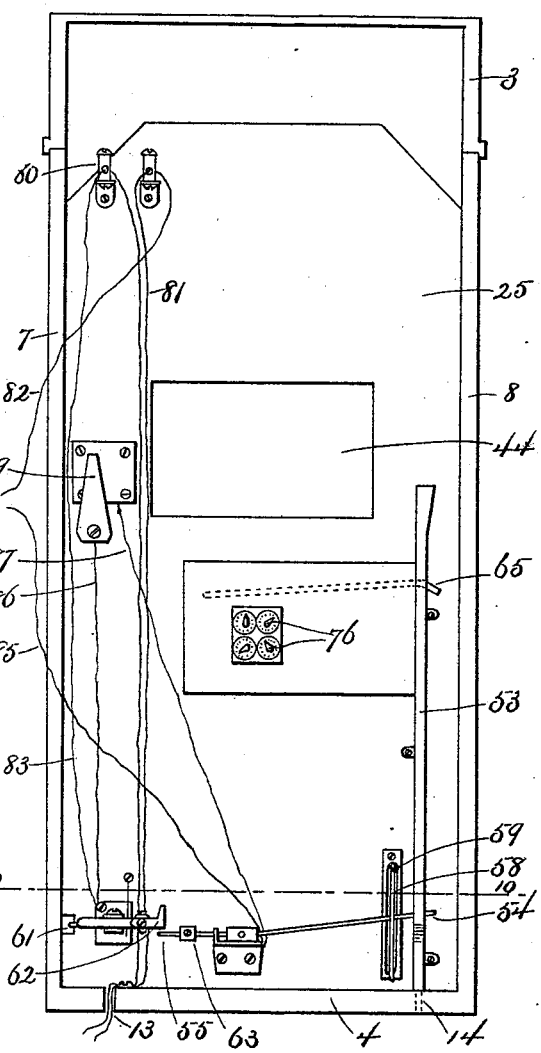
Figure 3:
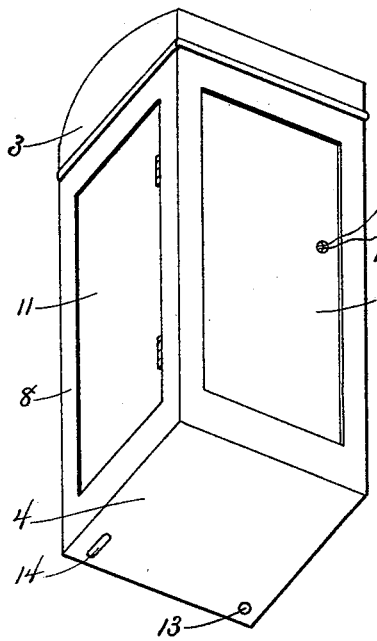
Figure 6:
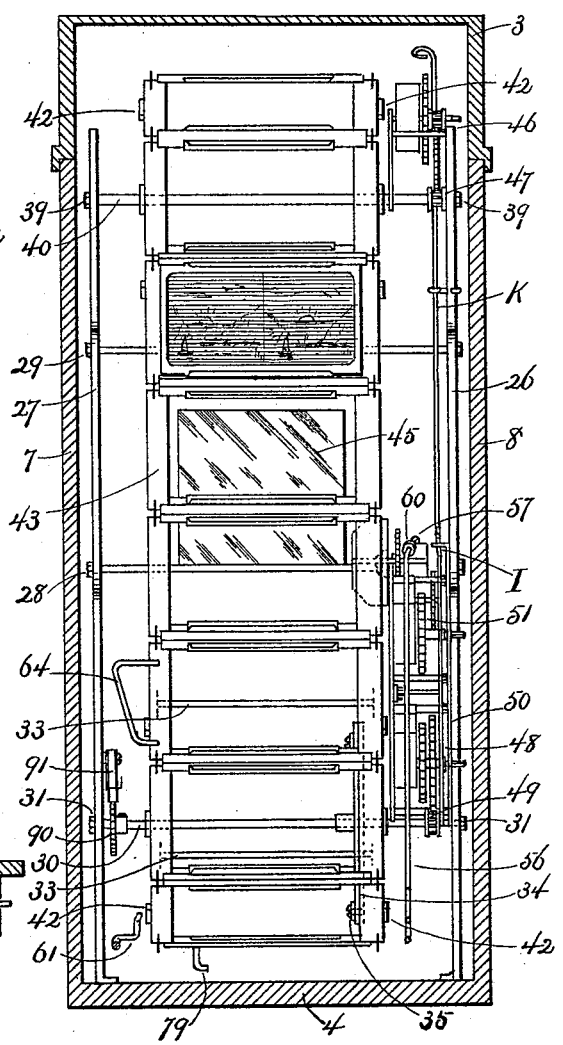
Figure 10:
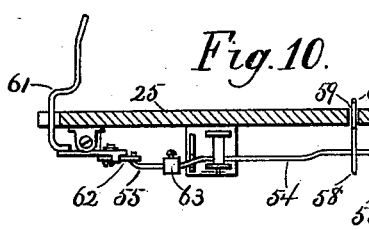
Figure 8:
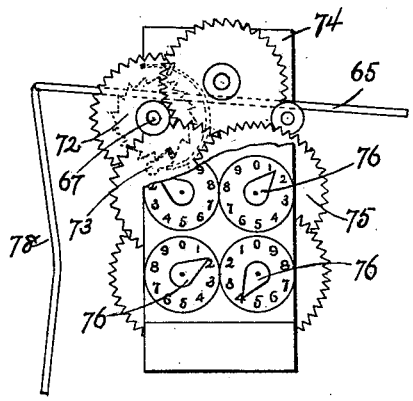
Figure 9:
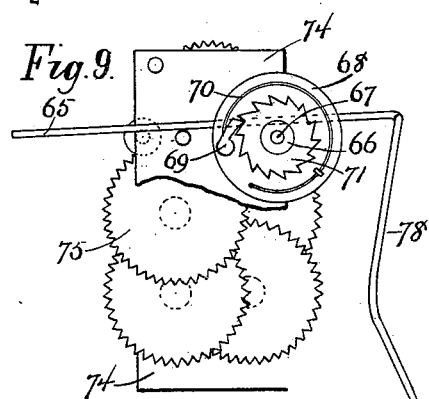
Figure 7:
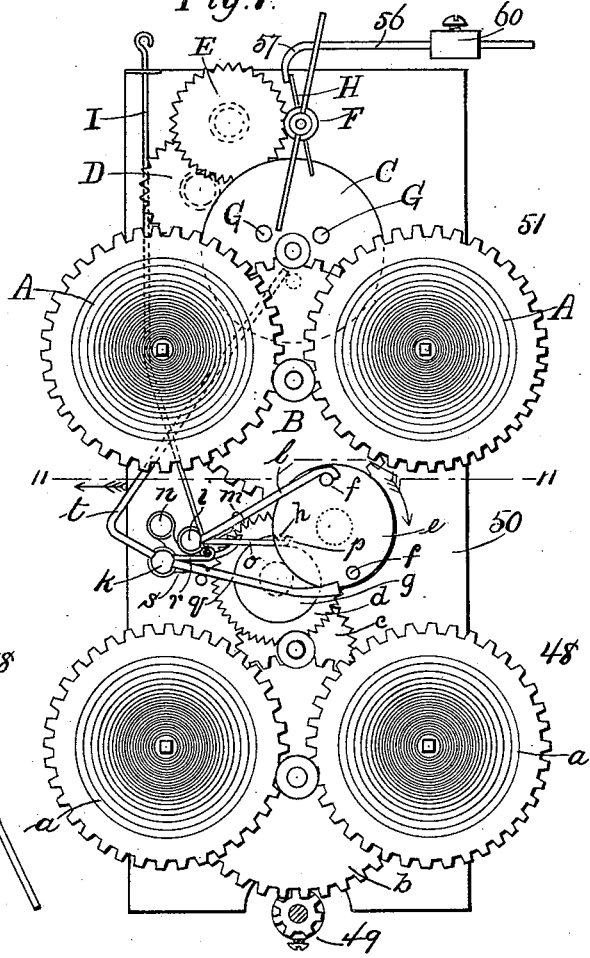
Figure 11:
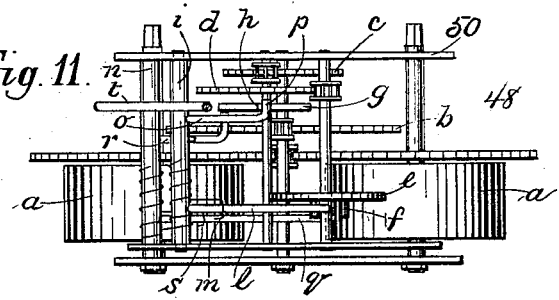

Figure 1 is a perspective view of the casing of the machine, showing the front and one side. Fig. 2 is a perspective view of the lower portion of the casing; Fig 3, a perspective view of the upper part of the casing, showing the rear and one side; Fig. 4, an enlarged front elevation with the casing removed; Fig. 5, a side elevation with the casing removed; Fig. 6, a vertical section on lines 6 6 of Fig. 5; Fig. 7, an enlarged detail view of the inside of the clock mechanism and time-regulating mechanism; Fig. 8, an enlarged detail front view of the register, partly broken away; Fig. 9, a corresponding view of the register from the rear; Fig. 10, a detached horizontal section on lines 10 10 of Fig. 4, showing the coin-controlled lever, U-shaped lever, and associated parts; Fig. 11, a horizontal section on lines 11 11 of Fig. 7.

In all figures similar letters and numerals of reference represent like parts.

This invention relates to coin-controlled apparatus for the exhibition of transparencies, the light for which is presented on the opposite side of the view or slide from the eyes of the spectator, the transparencies being mounted on an endless rotary band or series of sections operated by clock mechanism under control of a coin deposited in the usual slot or chute.

The invention consists in certain improvements in the mechanism for rotating and adjusting the band, registering the deposit of the coin, making and breaking connection of the electric light used to exhibit the transparencies, and other features fully described and claimed hereinafter.

In the drawings the casing containing the apparatus is shown divided into two parts 1 and 2, the upper part 1 consisting of a top 3, bottom 4, front 5, back 6, and sides 7 and 8. The top 3 is hinged to the upper edge of the side 7, so that it may be swung back to expose the interior of the casing. In the side 7 is an opening or glazed window 9, through which light is admitted to the interior of the casing from an incandescent light 10, the electric connections of which will be more fully described hereinafter. The opposite side 8 has a hinged door 11 for admission to the interior of the casing, while in the back 6 is a circular opening through which may pass conductors 12 for the electric light 10. In the bottom of the upper portion 1 of the casing are two openings—a circular one 13 and a slot 14—which correspond to similar openings 15 and 16 in the top of the lower portion 2 of the casing. The lower portion 2 of the casing is also provided with a drawer 17, with the usual handles 18 in front. The drawer 17 is adapted to hold a battery from which electric wiring may pass through the openings 15 and 13 into the interior of the upper portion 1 of the casing, and a money-box located beneath the slot 16 for the reception of the coin. The front 5 of the upper portion 1 of the casing is provided with an observation-glass or stereoscope 19, with the usual lenses 20, through which the transparencies may be seen. To one side of the stereoscope 19 is a slot 21 for the admission of the coin, and on the other side an electric button 22. In the lower part of the front 5 is an opening 23 to the coin-register, (described hereinafter,) and a hinged plate 24, (for the program or other notice,) normally held by a spring 24ᵃ against the front over the opening 23.

Within the upper portion 1 of the casing is a vertical plate 25, of wood or other material, parallel to the front 5. Two skeleton supports 26 and 27 are mounted on the bottom 4 and secured to the front plate 25 by binding-wires or other means and to each other by transverse rods 28 and 29. On the frame thus formed are loosely mounted on a revolving shaft 30, journaled in the supports 26 and 27 at 31, near the bottom thereof, two hexagonal wheels 32 secured together by rods 33. Rigidly mounted on the shaft 30 are two arms 34, which are adapted to be adjustably connected to the wheels 32 by means of screws and nuts 35, which may slide in concentric slots 36 in the wheels 32. By this means any rotary movement of the shaft 30 is communicated to the wheels 32, while they may be turned slightly on the shaft separately when desired.

In the upper part of the supports 26 and 27 are vertical slots 37, through which project bearings 39 for a shaft 40, on which are rigidly mounted two wheels 41, similar to the wheels 32. The bearings 39 being adjustable in a vertical line, the shaft 40 may be raised and lowered so that the distance between the upper pair of wheels 41 and lower pair 32 may be varied at will.

The wheels 32 and 41 are provided with peripheral flanges 42 on their outer sides to guide an endless band or belt 43, (formed as shown in a former patent, No. 526,539, granted to me September 25, 1894,) which passes over the wheels and is adapted to carry a number of transparencies. The front lap of the band 43 passes at the rear of a rectangular opening 44 in the vertical plate 25 opposite the stereoscope 19, and between the front and rear laps of the band on the rods 29 is arranged diagonally a reflector 45 to deflect the light from the window 9 onto the transparency directly in the rear of the opening 44.

The means for rotating the wheels 32 and 41 consist of two clock mechanisms, the upper of which, 46, is adjustably mounted on the upper end of one of the supports 26 and meshes with a pinion or gear 47 on the shaft 40. The tendency of this mechanism (which will not be described in detail) is to constantly rotate the shaft 40 and wheels 41, mounted thereon. A similar, but more powerful, clock mechanism 48 is mounted on the lower part of the support 26 to mesh with a similar pinion or gear 49 on the lower shaft 30, which in turn rotates the wheels 32 by means of the arms 34.

The lower clock mechanism 48 consists of two springs $a$ and a series of gears $b$, $c$, $d$, and $e$, the gear $b$ meshing with the pinion 49. On the gear $e$ are two or more stop-pins $f$, projecting laterally from one side thereof, and on the gear $d$ is a cam $g$, with an abrupt shoulder $h$. Two shafts $i$ and $k$ are journaled in the support 50 of the clock mechanism, the shaft $i$ carrying a crooked catch $l$, normally pressed downward by a torsional spring $m$, surrounding the shaft $i$ and extending to and abutting against a rigid shaft $n$ on the supports 50. On the shaft $i$ is also mounted a lever $o$, with a right-angled extension $p$, adapted to rest on the cam $g$ of the gear $d$. Shaft $k$ carries a stop or check $q$, adapted to engage the stop-pins $f$ on the gear $e$, and a lever $r$, which bears on the under side of the lever $o$. A torsional spring $s$, surrounding the shaft $k$ and abutting against shaft $n$, tends to force the check $q$ and lever $r$ downward. An operating arm or trigger $t$ is also rigidly secured to the shaft $k$ and extends upward, so that its upper end may be engaged by lateral trip-pins G on the gear C in a secondary train of gearing forming a time-regulating clock mechanism 51. This regulating mechanism 51 consists of two springs A and a train of gears B, C, D, E, and F, the gear C having the lateral trip-pins G and the gear F carrying the fly H.

The revolution of the band 43 is therefore effected in the following manner: The upper clock mechanism 46 is constantly tending to rotate the shaft 40 and wheels 41, while the lower mechanism 48 rotates the shaft 30 and wheels 32 when the train of gears is free to operate, which is only possible when the catch $l$ is not engaged with a stop-pin $f$ on the gear $e$, which revolves in the direction of the arrow, Fig. 7. Catch $l$, being rigidly secured to shaft $i$, is raised by means of the throw-off lever $r$ forcing up lever $o$, which is also rigidly secured to the shaft $i$. The throw-off lever $r$ is forced up when the shaft $k$, to which it is secured, is partially rotated, which is effected by trigger $t$ being forced in the direction of the arrow, Fig. 7, by the trip-pins G on the gear C of mechanism 51. On every third of a revolution (the number of trip-pins G being shown as three) of the gear C the trigger $t$ is forced toward the left, Fig. 7, and the catch $l$ released from engagement with the stop-pins $f$, but the same movement of trigger $t$ which releases catch $l$ raises check $q$, so that it will abut against one of the stop-pins $f$ on the gear $e$ when the gear $e$ is revolved far enough for the stop-pin $f$ to clear the catch $l$. Gear $e$ is thereby allowed but a slight revolving movement until the trip-pin G, being rotated on the gear C, releases the end of trigger $t$, in which case trigger $t$ is forced toward the right, Fig. 7, by torsional spring $s$ slightly rotating shaft $k$ and depressing check $q$ until it clears the stop-pin $f$ on gear $e$, permitting gear $e$ to revolve and the whole train of gears $d$, $c$, $b$, and $a$ to likewise revolve and rotate pinion 49, meshing with gear $b$, thereby setting in motion wheels 32 and rotating the band 43 so that the next transparency is moved to a place in front of the opening and stereoscope 19. When check $q$ is depressed, lever $o$ and catch $l$ are forced downward by torsional spring $m$; but catch $l$ can only be lowered sufficiently to engage a stop-pin $f$ on gear $e$ and stop the movement of the gear when the end $p$ of lever $o$ passes over the shoulder $h$ on cam $g$ on gear $d$. By means of this cam $g$ and the position of the stop-pins $f$ the length of movement of the revolution of the band 43 is determined, while the position of the trip-pins G on gear C regulates the length of time the band 43 is at rest.

A rod I is connected with the throw-off lever $r$ to draw the latter up and set the clock mechanism 48 in motion irrespective of the regulating mechanism 51. The rod I may be suitably connected to other rods (such as K, Fig. 5) to bring the operation of the clock mechanism 48, and the consequent revolution of the band, within reach on opening the casing 1 at the top 3.

The clock mechanism 48, and consequently band 43, being limited in its operation by the mechanism 51, the whole apparatus may be started or stopped by releasing or checking mechanism 51. This is accomplished by the coin-operated device, which consists, in the first place, of two coin-chutes, one, 52, inclined downward from the coin-slot 21 to a point over the upper end of the other, 53, which is vertical and is slotted in its sides, as shown in Fig. 5. In the inclined chute 52 are safeguards to prevent the passage of smaller coins, while the lower end of the vertical chute 53 is directly over the slot 14 in the bottom 4 of the upper portion of the casing, through which the coin may pass into the money-box in the lower portion 2 of the casing.

Extending through the lateral slots of the chute 53 are the ends of rod 65 and lever 54, connected with the registering mechanism (described hereinafter) and the operating mechanism, respectively. The coin-controlled lever 54 is pivoted on the vertical plate 25 to swing in a vertical plane, and has at its other end a horizontal hook 55. An L-shaped operating-lever 56 is pivoted to the rear of the plate 25, its horizontal arm terminating in a hook 57, which is adapted to engage the fly-wheel H of the mechanism 51 and when so engaged to check the mechanism. At the extremity of the vertical portion of the lever 56 is a loop 58, projecting through a slot 59 in vertical plate 25, through which extends the end of the coin-controlled lever 54. The loop 58 is so inclined that when the end of lever 54 is depressed it will force the lower end of lever 56 toward the rear, Fig. 5, and raise the horizontal portion to disengage the hook 57 from the fly-wheel H, allowing the mechanism 51 free movement.

The hook 57 is held from engagement with the fly-wheel H as long as the end of lever 54 is depressed, but immediately that the end of lever 54 is free to rise a weight 60 on the horizontal portion of the lever 56 forces the hook downward into engagement with the fly-wheel H, which checks the movement of mechanism 51.

The means for holding the end of lever 54 downward, so that the hook 57 is clear of the fly-wheel H, consists of a U-shaped lever 61, pivoted to the front of vertical plate 25 to swing in a horizontal plane. One end of lever 61 extends toward coin-controlled lever 54 in front of the plate 25 and has pivoted at its end a trip 62, which, when the end of lever 54, which extends through the loop 58 and chute 53, is depressed, engages the hook 55, which is raised at the same time. Hook 55 is then held in its raised position until lever 61 is swung on its pivot, so that trip 62 is forced inward toward plate 25 until disengaged from the hook 55, when the end of lever 54 is dropped into its natural position by a weight 63, attached thereto, and trip 62 may be forced outward to its original position by means of a wire spring, one end of which may be secured to the front of plate 25 and with its free end bearing against the rear of said trip, Fig. 4. One end of the U-shaped lever 61 extends to the rear of plate 25 and is adapted to be engaged by a wire cam 64 on the band 43, so that when the band 43 has completed a revolution the lever 61 is swung on its pivot, the trip 62 disengaged from hook 55, allowing the other end of lever 54 to swing upward, which in turn permits the lever 56 to swing on the pivot, and the hook 57 engages with fly-wheel H to stop mechanism 51, so that the further movement of the band 43 is stopped.

Rod 65, which, as stated above, extends into the chute 53, is rigidly connected to a sleeve 66, loosely mounted on the shaft 67. Also secured to this sleeve 66 is a disk 68, carrying a pawl 69 and spring 70, the former being adapted to engage with a ratchet-wheel 71, rigidly secured to shaft 67. A second ratchet-wheel 72, also secured to shaft 67, is adapted to be engaged by a spring-pressed pawl 73 on the frame 74, which supports the shaft 67. A series of gears 75, rotated by the movement of sleeve 66 through the pawls and ratchets, are provided with markers 76 to register on the four faces of a dial, in similar manner to a meter, the number of movements of the rod 65. The other end of rod 65 has a depending arm 78, which extends through the plate 25 and has its lower extremity slightly curved, as shown in Figs. 8 and 9. Laterally-projecting lugs 79 on the band 43 are adapted (upon the movement of the band) to engage with the depending end 78 and force it to one side, which turns the sleeve 66 and restores rod 65 to its normal position in chute 53. When the rod 65 is depressed by a coin, the sleeve is rotated sufficiently to allow the pawl 69 to engage the next succeeding tooth of the ratchet-wheel 71. When the end 78 of the rod is engaged by the lugs 79 on the band 43, the sleeve 66 is rotated slightly in the opposite direction, and by means of pawl 69 and ratchet 71 the shaft 67 is rotated sufficiently to permit pawl 73 to engage with the next succeeding tooth of ratchet-wheel 72 to prevent the reverse movement of shaft 67, when sleeve 66 is again turned in the opposite direction by rod 65. This slight movement of shaft 67 sets the gears 75 in motion until the movement is properly registered. By this means the fall of the coin in chute 53 starts the movement of sleeve 66, and the rotation of the band 43 (by means of the mechanisms set in motion by lever 54) completes the movement of sleeve 66, so that the coin is registered.

The connection of electric light 10 with the battery in the drawer 17 in the lower portion 2 of the casing is made and broken by lever 54, as follows: The wires 81 from the battery extend upward from the opening 13 in the bottom, or, in case power is received from outside instead of from a battery, the conductors 12 are secured to terminals or binding-posts 80 on the vertical plate 25. From thence the wires extend downward, one wire 82 passing to the light 10, while the other 83 extends to the pivot of the U-shaped lever 61. Another wire 85 extends from the pivot of coin-controlled lever 54 to the light 10. The connection between wires 83 and 85 and the completion of the circuit is effected when the hook 55 and trip 62 are engaged with each other, which is the case while the band is being rotated, as shown. Wires 86 and 87 extend from the pivots of levers 61 and 54 to a switch 89, which is operated by the push-button 22 in the front 5 of the casing. By means of the push-button 22 and switch 89 the electric light may be used to light the picture which is in the rear of the stereoscope when the band 43 is at rest.

A toothed wheel 90 is rigidly mounted on the shaft 30 and is engaged by a dog 91 on one of the supports 27 to prevent the backward movement of the wheels 32 and consequently of the band 43.

Having now described my invention, which may be varied in its details without departing from the spirit thereof, what I claim, and desire to secure by Letters Patent, is—

1. In a coin-controlled apparatus, the combination with an endless rotary band for carrying transparencies; of means for rotating said band; a clock mechanism for regulating said rotation; a coin-actuated lever; and an operating-lever adapted to engage with and check the movement of said regulating mechanism until released from such engagement by said coin-actuated lever upon the fall of the coin thereon, substantially as described.

2. In a coin-controlled apparatus, the combination with an endless rotary band for carrying transparencies; of means for rotating said band; a clock mechanism for regulating said rotation; an operating-lever adapted to engage with and check the movement of said regulating mechanism; and means for releasing said lever from engagement with said regulating mechanism upon the fall of the coin and holding it so released until the rotation of the band is concluded, substantially as described.

3. In a coin-controlled apparatus, the combination with an endless rotary band for carrying transparencies; of means for rotating said band; a clock mechanism for regulating said rotation; an operating-lever adapted to engage with and check the movement of said regulating mechanism; a coin-actuated lever for releasing said operating-lever from such engagement when one end is depressed by the fall of the coin; a trip adapted to retain said coin-actuated lever in the position to which it is forced by the coin; and means, on the rotation of said band, for releasing said coin-actuated lever from said trip, substantially as described.

4. In a coin-controlled apparatus, the combination with an endless rotary band for carrying transparencies; of mechanism for rotating the band; regulating mechanism controlling the movement of said rotating mechanism; an operating-lever having at one end a hook normally pressed by a weight into engagement with said regulating mechanism to check the same; and a coin-actuated lever connected with said operating-lever to raise the same from engagement with said regulating mechanism when said coin-actuated lever is depressed upon the fall of the coin, substantially as described.

5. In a coin-controlled apparatus, the combination with an endless rotary band for carrying transparencies; of mechanism for rotating the band; means for checking said rotating mechanism; a coin-actuated lever connected with said checking means to release said rotating mechanism upon the fall of the coin; a trip adapted to retain said coin-actuated lever in the position to which it is forced by the coin; means for disengaging said trip and coin-actuated lever upon the rotation of the band; and a weight on said lever to restore it to its normal position, substantially as described.

6. In a coin-controlled apparatus, the combination with an endless rotary band for carrying transparencies; of mechanism for rotating said band; means for checking said rotation by engagement with said rotating mechanism released upon the fall of the coin and held in disengagement until the completion of the rotation of the band; an electric light for lighting the transparencies, the connection of which forms a continuous circuit, when said checking means is disengaged from said rotating mechanism, substantially as described.

7. In a coin-controlled apparatus, the combination with an endless rotary band for carrying transparencies; mechanism for rotating said band; a coin-actuated lever; means for checking the rotating movement except upon the depression of one end of the coin-actuated lever by the fall of the coin; a trip adapted to retain said coin-actuated lever in the position to which it is forced by the fall of the coin; means for releasing said coin-actuated lever from said trip upon the rotation of the band; an electric light for lighting the transparencies, the connection for which forms a continuous circuit while said coin-actuated lever is held by said trip, substantially as described.

8. In a coin-controlled apparatus, the combination with a chute for the coin; of a register; a rod connected with said register, and extending into said chute, to be depressed upon the passage of a coin in the chute; mechanism which may be operated upon the fall of the coin in the chute; and means for restoring said rod to its normal position when said mechanism is in operation, substantially as described.

9. In a coin-controlled apparatus, the combination with the coin-chute; of an endless rotary band; mechanism for rotating said band so arranged that it is put in operation upon the fall of the coin in the chute; a register; a rod connected to said register, and extending into the chute to be depressed upon the passage of the coin in the chute; and means on said endless band for restoring said rod to its normal position; substantially as described.

10. In a coin-controlled apparatus, the combination with the coin-chute; of an endless rotary band; mechanism for rotating said band; a register operated by a ratchet-wheel mounted on a shaft connected to said register; a pawl secured to a sleeve loosely mounted on said shaft; a rod connected to said sleeve, having one end extending into the coin-chute to be depressed upon the fall of the coin to engage said pawl with said ratchet-wheel, the other end adapted to be engaged by mechanism on said band to partially rotate said ratchet-wheel when engaged by said pawl, substantially as described.

11. In a coin-controlled apparatus, the combination with a rotary shaft, with laterally-projecting arms; of mechanism for operating said shaft; wheels loosely mounted on said shaft, one or both of which are provided with concentric slots in which the outer ends of said arms are adjustably secured; and an endless band for carrying transparencies mounted on said wheels, substantially as described.

12. In a coin-controlled apparatus, the combination with an endless rotary band; of a coin-actuated lever; clock mechanism for operating said band, having a wheel provided with stop-pins; regulating mechanism checked and released upon the movement of said coin-actuated lever, and having a wheel provided with lateral trip-pins; a trigger controlled by said trip-pins; and a catch adapted to engage with said stop-pins until released by the movement of said trigger, substantially as described.

13. In a coin-controlled apparatus, the combination with an endless rotary band; of clock mechanism for operating said band having a wheel provided with stop-pins, and a cam-shaped disk; regulating mechanism, having a wheel provided with lateral trip-pins; a trigger controlled by said trip-pins; a catch adapted to engage said stop-pins, and released therefrom by the movement of said trigger, and held from reëngagement by said cam, substantially as described.

14. In a coin-controlled apparatus, the combination with an endless rotary band; of clock mechanism for operating said band having a wheel provided with stop-pins, and a cam-shaped disk; regulating mechanism, having a wheel provided with lateral trip-pins; a trigger controlled by said trip-pins; a catch adapted to engage with said stop-pins, and released therefrom by the movement of said trigger; and a check to engage said stop-pins upon the movement of said trigger in releasing said catch, said catch being held from engagement by said cam, substantially as described.

15. The combination with two clock mechanisms, one having a wheel carrying stop-pins, and a cam-shaped rotary disk, the other having a wheel provided with lateral trip-pins; of a trigger controlled in its movements by said trip-pins; a catch normally pressed by a spring into engagement with said stop-pins, and released therefrom on the movement of said trigger; a check thrown upon the movement of said trigger into engagement with said stop-pins, when the catch is free from said stop-pins, and released from such engagement upon the reverse movement of said trigger, the catch being held from reëngagement during the rotation of said cam, substantially as described.

In witness whereof I have hereunto set my hand, at New Haven, in the county of New Haven, State of Connecticut, this 2d day of February, 1897.

WILLIAM REEVES.

Witnesses:
GEORGE W. ROBINSON,
F. PHILIP FARNSWORTH.